June 24, 1924.
S. M. SHULL
TIRE TREATING APPARATUS
Filed April 18, 1923      2 Sheets-Sheet 1
1,498,935
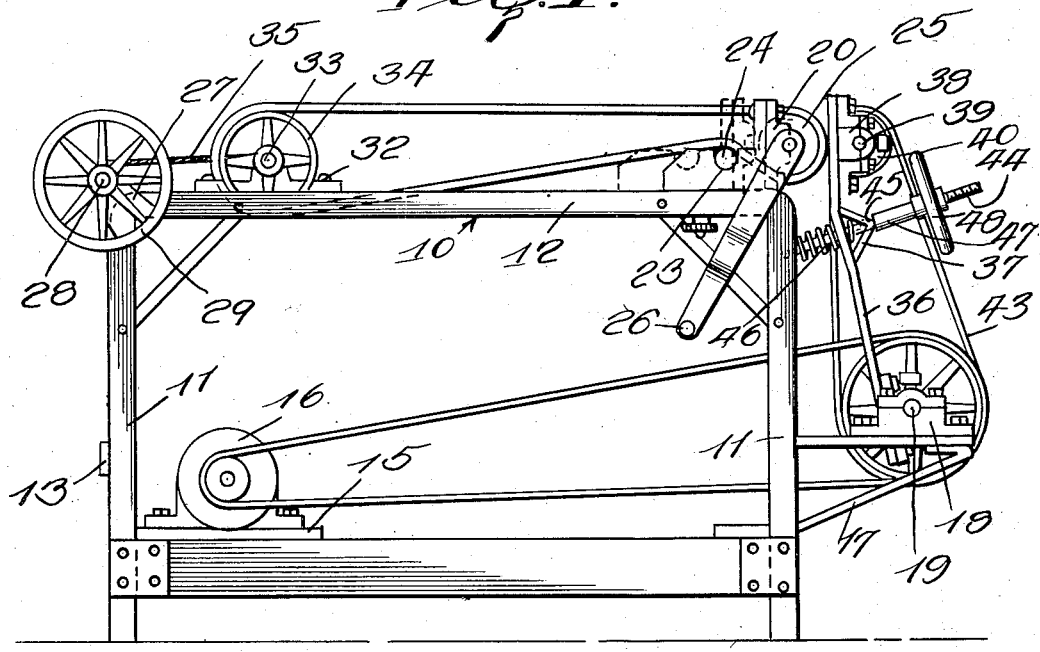
Fig. 1.
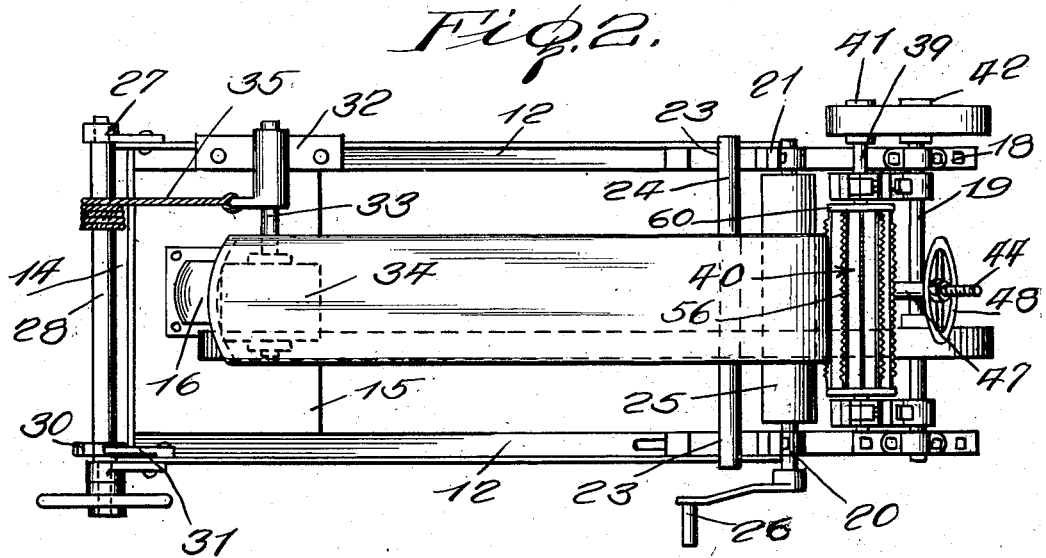
Fig. 2.
Fig. 3
Inventor
Samuel M. Shull
By Watson E. Coleman
Attorney

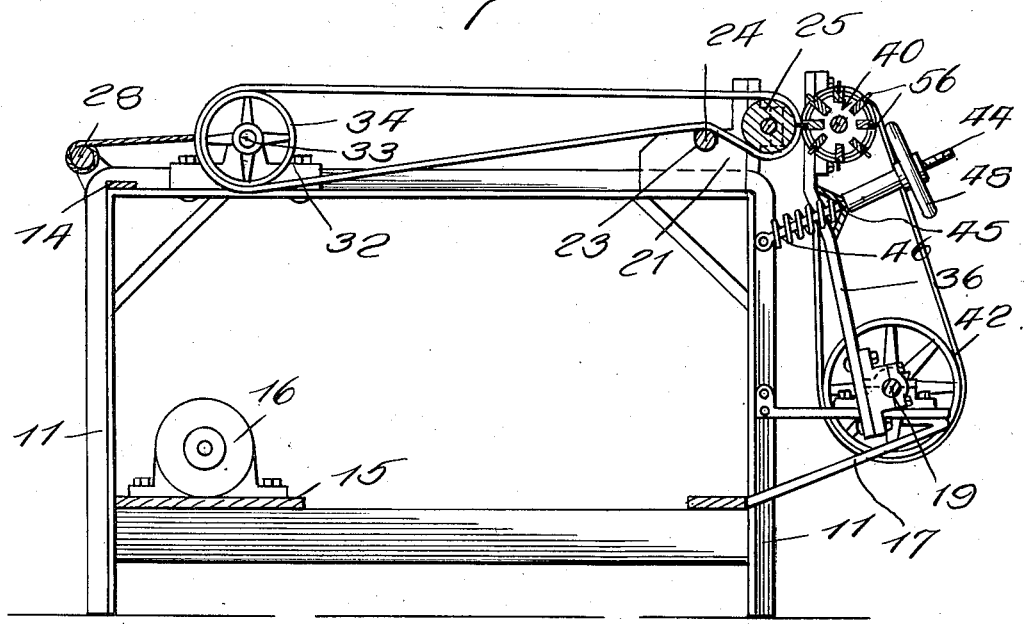

Patented June 24, 1924.

1,498,935

UNITED STATES PATENT OFFICE.

SAMUEL M. SHULL, OF LEWISTOWN, MONTANA.

TIRE-TREATING APPARATUS.

Application filed April 18, 1923. Serial No. 632,889.

*To all whom it may concern:*

Be it known that I, SAMUEL M. SHULL, a citizen of the United States, residing at Lewistown, in the county of Fergus and State of Montana, have invented certain new and useful Improvements in Tire-Treating Apparatus, of which the following is a specification, reference being had to the accompanying drawings.

This invention relates to tire treating apparatus and more particularly to an apparatus for treating worn automobile tires to prepare the same for use as blow-out patches, reliners and the like.

An important object of the invention is to provide a device of this character which enables the stripping of the old rubber and outer layers of fabric and cord from the tire by machinery, these operations being ordinarily performed by hand.

A further object of the invention is to provide in combination means for spreading and flattening a tire and for shifting the same, together with a rotatable cutter or stripper operating upon the tire during such shifting.

A still further object of the invention is to provide a novel and improved cutter head for use in this connection.

These and other objects I attain by the construction shown in the accompanying drawings, wherein for the purpose of illustration is shown a preferred embodiment of my invention and wherein:—

Figure 1 is a side elevation of a tire treating machine constructed in accordance with my invention;

Figure 2 is a plan view thereof;

Figure 3 is a fragmentary side elevation of one of the blades employed in the cutter head;

Figure 4 is a longitudinal sectional view through the machine;

Figure 5 is an enlarged detailed cross sectional view through the cutter head;

Figure 6 is an enlarged longitudinal sectional view therethrough;

Figure 7 is a side elevation of one of the disks employed in the cutter head; and Figure 8 is a vertical sectional view therethrough.

Referring now more particularly to the drawings, the numeral 10 indicates a frame comprising supporting legs 11 and spaced longitudinally extending members 12 connecting the upper ends of the legs 11 at corresponding sides of the frame, the legs being suitable braced to one another and to the longitudinally extending members, as indicated at 13 and 14. The legs beneath the longitudinally extending members form a support for a motor base 15 and have mounted thereon an operating motor 16 and to an end pair of the legs 11 are secured supports 17 forming a mounting for bearings 18 in which is mounted a shaft 19 driven from the motor 16.

At the corresponding end of the machine above the shaft and upon the longitudinally extending members 12 are mounted a pair of bearings 20 and 21. Bearing 21 is of the ordinary construction but the bearing 20 is in reality a groove in the vertically disposed front wall of the bearing 20 and the bearing is slidably mounted upon the longitudinally extending member 12 and may be shifted longitudinally thereon. Each of the bearings 20 and 21 has formed in the upper surface thereof a bearing groove 23 for the reception of one end of a roller 24. A second roller 25, hereinafter referred to as the flattening roller, has one end of its shaft extended into the bearing 21 and the opposite end of its shaft abutting the bearing groove of the shiftable bearing 21. This end of the flattening roller shaft its provided with an operating handle 26 which is removable. At the opposite end of the frame 10 upon the longitudinally extending members 12 a pair of bearings 27 are mounted in which is engaged a transversely extending shaft 28 provided at one end with an operating wheel 29 and having thereon a ratchet 30 engaged by a pawl 31 carried by the frame and which prevents rotation of the shaft 28 in one direction until it is released.

Slidably mounted upon a side member 12 is a bearing 32 having therein a stub shaft 33 upon which is mounted a wheel 34. The bearing 32 has secured thereto one end of a cable 35, the opposite end of which is secured to the shaft 28. By rotating the shaft 28 through the operating wheel 29 thereof the bearing 32 may be shifted toward the shaft 28 and its return is prevented by the ratchet and pawl engagement of the shaft 28 with the frame. The bearing, however, may be shifted forwardly when the pawl 31 is released.

Rotatably mounted upon the shaft 19 are a pair of spaced arms 36 connected adjacent their upper ends by a cross member 37 and provided at their upper ends with bearings 38 in which is rotatably mounted a shaft 39 having mounted thereon between the bearings 38 a cutter head 40. One end of the shaft 38 is provided with a pulley 41 driven from a pulley 42 mounted upon the shaft 19 through a belt 43. Secured to the cross member 13 at this end of the frame 10 is a threaded shaft 44 which is directed through an opening 45 formed in the cross member 37 connecting the arms 36. A spring 46 surrounds the shaft 44 between the brace and the cross member 37 and normally urges this cross member away from the brace. A sleeve 47 surrounds the shaft 44 outwardly of the cross member 37 and is abutted at its outer end by a wheel nut 48 mounted upon the shaft 44. By adjusting this nut the cutter head 40 may be moved toward or away from the flattening roller 25, movement in one direction being accomplished by the engagement of the sleeve with the cross member and in the opposite direction by the spring 46.

In the use of the machine the tire casing to be operated upon first has the beads thereof removed. The bearing 20 is then slid back and the handle 26 removed from the shaft of the roller 25, thus permitting the casing to be slid over the end of the roller when the bearing 20 is returned to its normal position and secured in such position and the roller 23 inserted in the bearing grooves of the bearings 20 and 21. The casing is then drawn rearwardly of the frame 10 and placed about the wheel 34 after which the hand wheel 29 is rotated and the casing is sufficiently tensioned to be flattened upon the roller 25. By rotating the handle 26 of the roller 25 the casing may be caused to travel about this roller and that portion thereof about the roller and next adjacent the cutter head 40 will be flattened by the tension applied to the casing. This portion of the casing is thus positioned for action by the cutter head and by adjusting the cutter head inwardly to engage the casing face the outer rubber may be removed and then successive layers of fabric until the casing is reduced to the desired size, after which the pawl 31 is released to permit disengagement of the wheel 34, the bearing 20 slid rearwardly and the casing removed.

The cutter head 40 includes a plurality of disks 49 rigidly secured to the shaft 39. The endmost disks 49 have formed in their adjacent faces a plurality of radially extending slots 50 which communicate with corresponding slots 51 in the periphery of the disks. The intermediate disk or disks, as the case may be, are provided in opposite side faces thereof with such radial slots, corresponding slots of opposite faces being connected by the slots 51 formed in the periphery. The disks are secured to the shaft 39 with the slots thereof in alignment. The numeral 52 designates blade holders in the present instance shown as each comprising a pair of plates 53 adapted to engage in the slots 51 of the disks and having skirt portions 54 extending into the radially extending slots 50 of the disks, so that these blade holders are positioned radially as respects the shaft 39. The adjacent faces of the plates 53 are rabbeted so that when the plates are combined and positioned in the slots a slot is formed therebetween, as indicated at 55, in which is seated a blade 56. The plates 53 are provided with aligned openings 57 for the reception of retaining pins 58 which pass through similar openings 59 in the blades 56 to hold the blades in position between the plates 53 and at the same time to render them readily removable.

In assembling the cutter head, the disks being properly positioned upon the shaft, the blade holders 52 are inserted, the blade being positioned therein subsequently such retaining rings 60 are driven upon the ends of the blade holders retaining them in position in the slots and further assisting in holding the saws in position therein. These saws or cutting blades are so called because they are provided upon their outer edges with a plurality of saw-like teeth 61. Blades of this character are particularly adapted for removing fabric from old casings. Where it is desired to employ the device for removing old rubber from casings, blades such as shown in Figure 3 are employed the teeth of which are well spaced. When using these blades a lesser number of the blades is employed and the teeth of the blades are staggered with relation to one another. The cutter heads, if desired, may be permanently mounted upon separate shafts 39 and the shafts interchanged in the swinging arbor of the machine.

It will be seen that by the use of a machine constructed in accordance with my invention, a tire casing may be readily stretched and held flat to be operated upon by the cutter head of the swinging arbor. It will likewise be obvious that by such a construction the labor of preparing such casings for use as reliners or tire patches is materially reduced, thus enabling the production of such device at a relatively low cost. It will furthermore be obvious that the structure hereinbefore set forth is capable of some change and modification without materially departing from the spirit of my invention and I accordingly do not limit myself to such specific structure except as hereinafter claimed.

I claim:—

1. In a tire treating machine and in combination a roller adapted to be engaged interiorly of the tire, a wheel likewise engageable interiorly of the tire, means for adjusting the wheel away from said roller to tension the tire upon the roller and to hold the wheel in adjusted position, a rotatable cutter head adjustable toward and away from said roller, means for rotating the cutter head and manual means for rotating the roller.

2. In a device of the type described, a roller, a cutter head adjustable toward and away from the roller, a withdrawable bearing for one end of said roller, a rotatable wheel in spaced relation to said roller and at the opposite side thereof from said cutter head and means for adjusting said wheel in a direction away from said roller and for securing said wheel in adjusted position.

3. In a tire treating machine and in combination, a supporting frame, a roller rotatably mounted on said frame, means for rotating the roller, a shaft rotatably mounted on the frame, means for rotating the shaft, a swinging arbor carried by said shaft and having its free end adjustable toward and away from said roller, a cutter head carried by the free end of the arbor, a driving connection between the shaft and cutter head and means upon the frame in the opposite side of the roller from the cutter head for tensioning a tire casing about said roller.

4. In a tire treating machine and in combination, a supporting frame, a roller rotatably mounted on said frame, a shaft rotatably mounted on the frame, means for rotating the shaft, a swinging arbor carried by said shaft and having its free end adjustable toward and away from said roller, a cutter head carried by the free end of the arbor, a driving connection between the shaft and cutter head, means upon the frame in the opposite side of the roller from the cutter head for tensioning a tire casing about said roller, including a shaft, a wheel rotatable on the shaft and engageable in the casing and means for adjusting said shaft away from said roller.

5. In a tire treating machine as a subcombination, a cutter head including a shaft, a plurality of disks mounted upon the shaft and provided with radially directed slots, blade holders engageable in said slots and each provided in its outer edge with a radially directed slot, a blade disposed in the slot of each blade holder, removable means extending through the blade holder and blade for retaining the blades in position thereon and means for retaining the blade holders in position in said slots.

6. In a tire treating machine as a subcombination, a cutter head including a shaft, a plurality of disks mounted upon the shaft and provided with radially directed slots, blade holders engageable in said slots and each provided in its outer edge with a radially directed slot, a blade disposed in the slot of each blade holder, removable means extending through the blade holder and blade for retaining the blades in position thereon, means for retaining the blade holders in position in said slots, comprising bands driven upon the ends of said blade holders and engaging the outer faces of the blade holders and blades.

7. In a tire treating machine as a subcombination, a cutter head comprising a shaft, a plurality of disks rigidly secured to the shaft, each of said disks having in at least one side face thereof radially directed slots, the slots of the disks being aligned, transversely extending slots formed in the periphery of the disks and communicating with the radially directed slots thereof, blade holders engaged in the last named slots and having flanges extending into the first named slots of the disks and blades carried by each of said blade holders.

8. In a tire treating machine as a subcombination, a cutter head comprising a shaft, a plurality of disks rigidly secured to the shaft, each of said disks having in at least one side face thereof radially directed slots, the slots of the disks being aligned, transversely extending slots formed in the periphery of the disks and communicating with the radially directed slots thereof, blade holders engaged in the last named slots and having flanges extending into the first named slots of the disks and blades carried by each of said blade holders, said blade holders each comprising a pair of plates provided upon adjacent faces thereof at their outer edges with rabbets combining to form a blade receiving groove.

In testimony whereof I hereunto affix my signature.

SAMUEL M. SHULL.